United States Patent [19]

Narayanaswami

[11] Patent Number: 5,973,705
[45] Date of Patent: Oct. 26, 1999

[54] GEOMETRY PIPELINE IMPLEMENTED ON A SIMD MACHINE

[75] Inventor: Chandrasekhar Narayanaswami, Valhalla, N.Y.

[73] Assignee: International Business Machines Corporation, Armonk, N.Y.

[21] Appl. No.: 08/840,058

[22] Filed: Apr. 24, 1997

[51] Int. Cl.$^6$ .................................................. G06F 15/80
[52] U.S. Cl. .................... 345/505; 345/523; 364/748.08; 395/800.22
[58] Field of Search ..................................... 345/418, 419, 345/425–439, 501–506, 522–524, 507; 364/130–134, 136, 748.01, 748.08, 748.13, 752, 753, 765; 395/800.1, 800.16, 800.17–800.23, 562, 563

[56] References Cited

U.S. PATENT DOCUMENTS

| | | | |
|---|---|---|---|
| 3,515,344 | 6/1970 | Goldschmidt et al. ................. | 235/175 |
| 4,805,116 | 2/1989 | Liang et al. ............................. | 345/429 |
| 4,876,644 | 10/1989 | Nuechterlein et al. ............... | 395/800.3 |
| 4,878,190 | 10/1989 | Darley et al. ........................... | 364/752 |
| 5,159,665 | 10/1992 | Priem et al. ............................. | 345/434 |
| 5,220,524 | 6/1993 | Hesson ................................. | 364/748.08 |
| 5,307,450 | 4/1994 | Grossman ............................... | 345/423 |
| 5,317,526 | 5/1994 | Urano et al. ......................... | 364/715.03 |
| 5,457,779 | 10/1995 | Harrell .................................... | 345/502 |
| 5,613,146 | 3/1997 | Gove et al. ........................... | 395/800.2 |
| 5,630,160 | 5/1997 | Simpson et al. ..................... | 364/232.8 |
| 5,666,301 | 9/1997 | Makino ............................... | 364/754.01 |
| 5,745,125 | 4/1998 | Deering et al. ......................... | 345/503 |
| 5,748,863 | 5/1998 | Fossum .................................... | 345/422 |
| 5,764,555 | 6/1998 | McPherson et al. ............... | 364/748.03 |
| 5,768,170 | 6/1998 | Smith .................................. | 364/748.1 |

*Primary Examiner*—U. Chauhan
*Attorney, Agent, or Firm*—Jay P. Sbrollini, Esq.; Perman & Green, LLP

[57] ABSTRACT

Instructions in an execution pipeline of a SIMD machine are monitored, preferably in the instruction decode phase. Upon detecting a 1/x or 1/sqrt(x) reciprocal operation, portions of the data are forwarded to logic that implements the given instruction. The portions of the instruction that are forwarded include the data value of x and the target address (or register) to which to write the result. The logic generates an n-bit seed for iterative processing by an arithmetic unit, and eliminates a requirement to provide lookup tables in each SIMD processor.

25 Claims, 6 Drawing Sheets

SIMD PROCESSOR

SIMD ARCHITECTURE

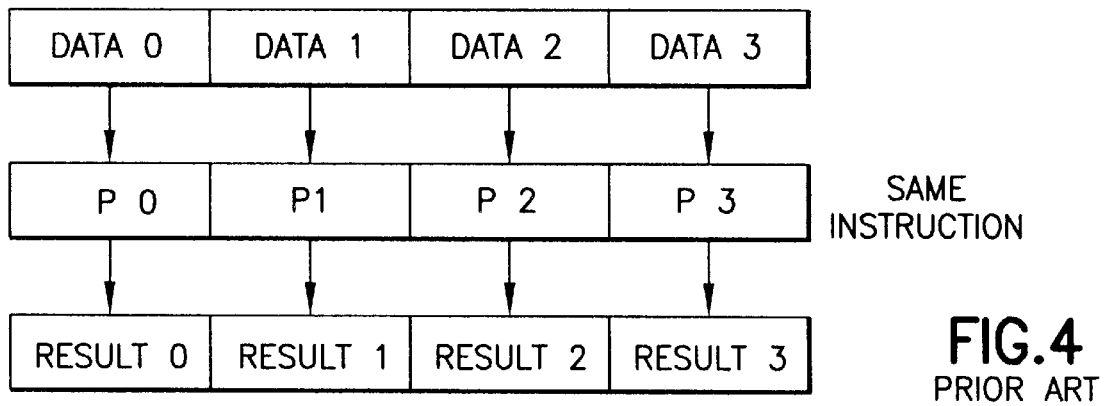
FIG.4
PRIOR ART
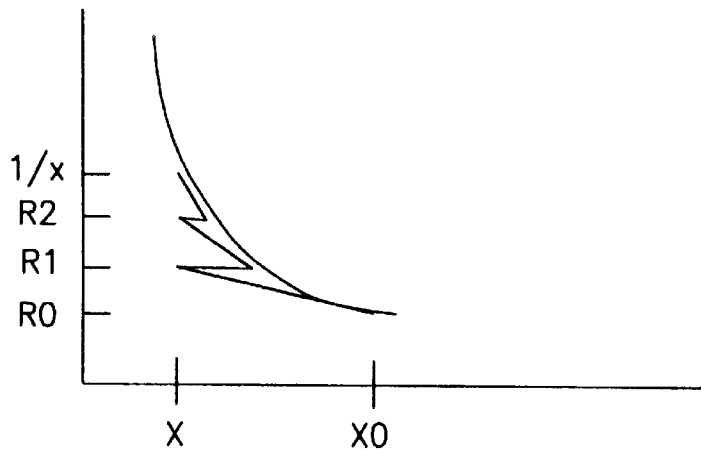
FIG.5
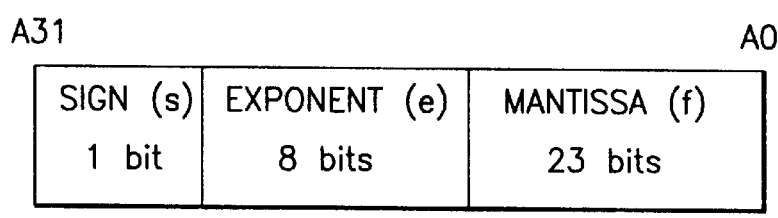
$$[(-1)^s] * (1+f) * (2^{(e-127)})$$
FIG.6
|  | SIGN | EXPONENT | MANTISSA |
|---|---|---|---|
| INPUT | s | e | f |
| OUTPUT | s | h | g |
FIG.7

$(127-e)1/x$ $(\frac{379-e}{2})1/\sqrt{x}$

GEOMETRY PIPELINE IMPLEMENTED ON A SIMD MACHINE

FIELD OF THE INVENTION

This invention relates generally to data processing systems that perform graphics-related computations for rendering displayable objects and, in particular, to Single Instruction Multiple Data (SIMD) processors that perform graphics-related computations.

BACKGROUND OF THE INVENTION

Referring to FIGS. 3 and 4, in a SIMD (Single Instruction Multiple Data) machine, several processors (e.g. P0–P3) execute the same instruction while operating on different data. The instruction and data are fetched from a memory 1 and input to the processors via a memory controller 2, a shared bus or cross bar switch arrangement 3, and an instruction data dispatcher/gatherer 4. The processors then operate in a lock step fashion and output their results to target registers or to the memory 1, depending on the instruction. A processor may be removed from a computation by setting a mask bit for that processor. Typically, each processor contains its own set of registers. The processors may be realized as separate devices, or may be incorporated into a single chip.

A SIMD machine may implement the geometry pipeline of a graphics system. In this implementation, the vertices (on which the geometric processing is to be performed) are partitioned into groups each of which corresponds to a processor of the SIMD machine. The memory controller 2 loads vertex data (x,y,z,w coordinates, Nx, Ny, Nz normal coordinates) from the memory 1 to the assigned processor (P0–P3) to perform the geometric processing. The assigned processor performs the geometric processing (e.g., coordinate transformation, lighting, clipping, perspective projection) on the vertex data. Typically, a reciprocal 1/x operation is used for perspective projection of a vertex, for texture mapping calculations, and for color and other parameter slope calculations such as texture coordinates, alpha (transparency), and depth. A reciprocal 1/sqrt(x) operation is used for normalization of the vertex normal, light vectors, etc.

The 1/x and 1/sqrt(x) operations are each broken into two phases, the seed (i.e., initial estimate) phase and the refinement phase, which are referred to as the seed instruction and the refinement instruction, respectively. The refinement phase may have several refinement instructions, depending on the desired accuracy of the result. The processing sequence for 1/x may be as follows:

```
recip_seed x, target
refine_recip seed, target
    refine_recip  seed, target
    refine_recip  seed, target
```

The above sequence may be preceded and followed by other conventional instructions.

The operations 1/x and 1/√x occur very frequently in the geometry processing part of the graphics pipeline, and their execution consumes a considerable amount of processing time and resources.

As was indicated above, the 1/x operation can be used for perspective projection of geometric objects, and the 1/√x operation can be used to normalize vectors that are used in performing lighting calculations. These operations are executed at least once per vertex and collectively consume about 20% of the overall vertex processing time (if no special techniques are used for this purpose). If perspective correct texture mapping is also performed, this figure may rise to 30% of the overall processing time. Thus, it is important to execute 1/x and 1/√x operations efficiently to speed up the vertex processing rate in the geometry pipeline.

It is known in the art to employ ROM-based lookup tables to speed the 1/x and 1/sqrt calculations. However, this technique is not efficient for SIMD architectures, due to the large size of each table.

In U.S. Pat. No. 5,457,779 Harvell discloses a conventional SIMD machine used for a computer display system, in particular a four processor or geometry engine embodiment. Col. 3 of this patent makes reference to the above-described 1/x computation.

It can be appreciated that it would be desirable to provide an efficient and fast technique to execute the 1/x and 1/sqrt(x) operations so as to decrease the total processing time required to render complex geometric objects in a computer display system. This invention addresses this long felt need.

OBJECTS AND ADVANTAGES OF THE INVENTION

It is a first object and advantage of this invention to provide an improved technique to perform 1/x and 1/sqrt(x) mathematical operations.

It is another object and advantage of this invention to provide a hardware-based technique to assist in the calculation of 1/x and 1/sqrt(x) functions, without requiring a ROM-based lookup table.

SUMMARY OF THE INVENTION

According to the present invention, instructions in an execution pipeline of a SIMD machine are monitored, preferably in the instruction decode phase. Upon detecting a 1/x or 1/sqrt(x) seed instruction, portions of the instruction are forwarded to combinatorial logic that implements the given instruction. The portions of the instruction that are forwarded include the data value of x and the target address (or register) to which to write the result. The combinatorial logic that implements the 1/x and 1/sqrt(x) seed instruction is described in detail below.

The seed instructions for 1/x and 1/sqrt(x) typically have a source register and a target register. Once an instruction is issued the machine waits for the instruction to complete before issuing the next instruction, if the next instruction depends on the results of the present instruction. In other cases the next instruction may be issued to another unit of each processor if the processor is a superscalar (with more than one arithmetic unit) machine. After the seed instruction is decoded, the x value corresponding to each processor may be placed in the source register specified in the instruction. The seed logic then places the seed in the target register. At the end of this phase, each processor has the seed for its x value. The next phase is the iteration phase where the seed is used to refine the approximation and to obtain a more accurate result. The refinement instruction uses the result from the seed instruction and performs a refinement operation as described below. Once the necessary refinement is performed, the processors may execute other instructions following the refinement instructions.

BRIEF DESCRIPTION OF THE DRAWINGS

The foregoing and other aspects of this invention are described with respect to the Drawing Figures, wherein:

FIG. 4 is a diagram that is useful in understanding the operation of the SIMD machine of FIG. 3;

FIG. 5 is a graphical interpretation of a Newton Raphson formula;

FIG. 6 is a representation of a 32 bit floating point number;

FIG. 7 is a floating point representation of input and output;

DETAILED DESCRIPTION OF THE INVENTION

Figure 1:
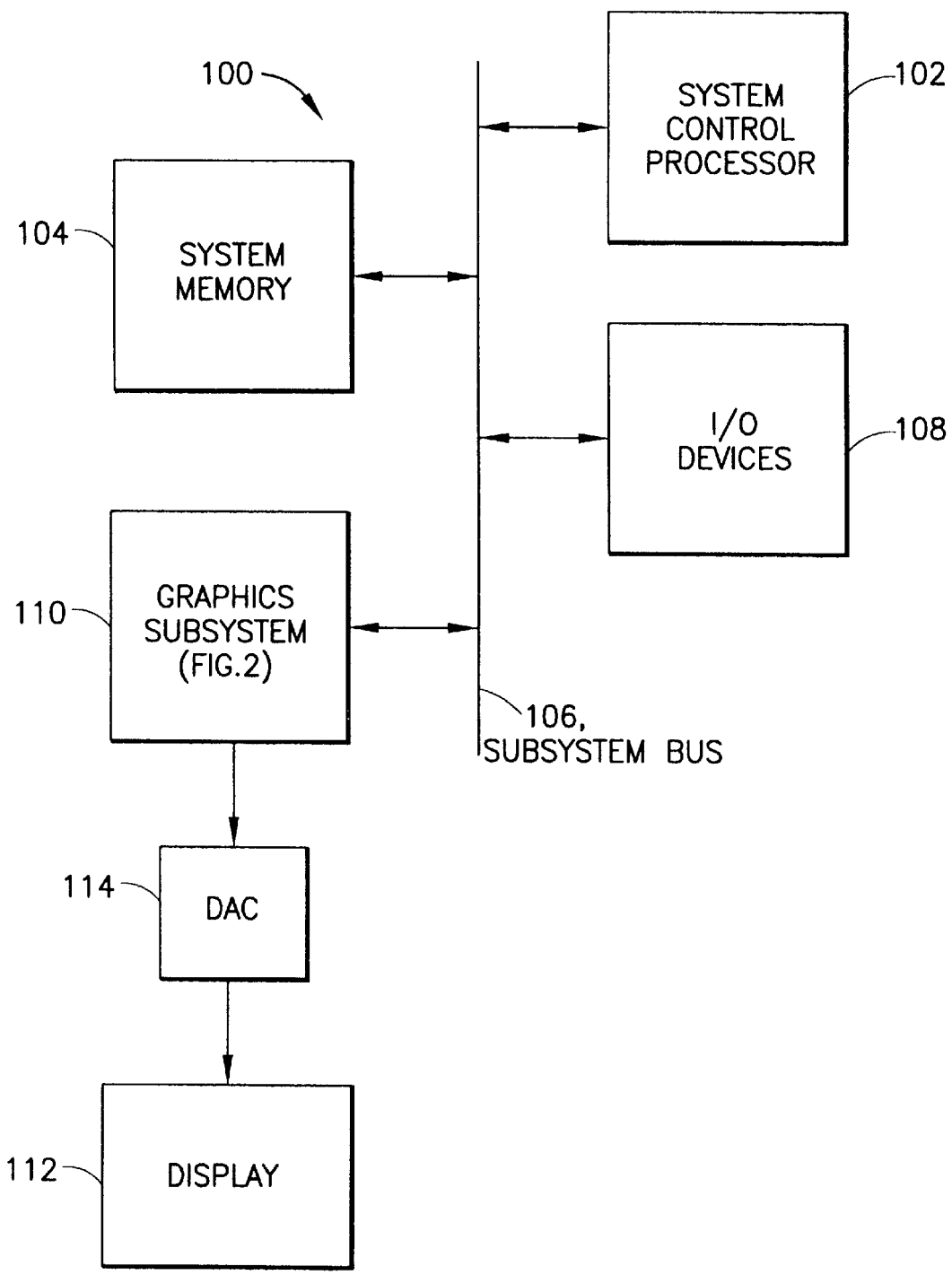
FIG. 1 is a block diagram of a graphics processing system that is suitable for practicing this invention.

The overall architecture of a graphics processing system 100 that is suitable for practicing this invention is depicted in FIG. 1. As shown, the graphics processing system 100 includes a system control processor 102 which is coupled to a system memory 104 via a system bus 106. The system memory 104 includes random access memory (RAM) that stores graphics data defining objects contained in one or more three dimensional models/views. The system memory 104 also stores an application program running on the system control processor 102 that provides a user-interface to navigate through and/or modify the three-dimensional models/views defined by the graphics data stored in the memory 104. The graphics data that defines each object includes coordinates and attributes (e.g. color) of primitives. The primitives are geometric entities such as a solid, line, or surface. Typically, the primitives are triangles defined by three vertices. In this case, the system memory 104 includes an ordered list of vertices for triangles that define the surfaces of objects that make up a three dimensional view. In addition, the system memory 104 may store a list of primitive identifiers that correspond to each of the primitives, and transformation matrices that specify how and where the primitives are to be displayed. Input/output (I/O) devices 108 interface to the system control processor 102 via the system bus 106. The I/O devices 108 may include one or more of a keyboard, template, or touch pad for text entry, a pointing device such as a mouse, trackball, or light pen for user input, and speech recognition for speech input.

The graphics processing system 100 also includes a graphics subsystem 110 that interfaces to the system memory 104 via the system bus 106. The graphics subsystem 110 is of most interest to the teachings of this invention, and is shown in greater detail in FIG. 2A. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form and, typically, the display device 112 requires the pixel data in analog form. In this case, a digital-to-analog converter (DAC) 114 can be placed between the graphics subsystem 110 and the display device 112 to convert the pixel data from the digital to the analog form that is suitable for driving the display device 112.

The graphics subsystem 110 of this invention, as described below, may be implemented in hardware as, for example, a gate array or a chip set that includes at least one programmable sequencer, memory, integer processing unit (s) and floating point unit(s), if needed. In addition, the graphics subsystem 110 may include a parallel and/or pipe-lined architecture as shown in U.S. Pat. No. 4,876,644, commonly assigned to the assignee of the present invention and herein incorporated by reference in its entirety. In the alternative, the graphics subsystem 110 may be implemented in software together with a processor. The processor may be a conventional general purpose processor, a part of the system control (host) processor 102, or part of a co-processor integrated with the host processor 102.

Figure 2A:
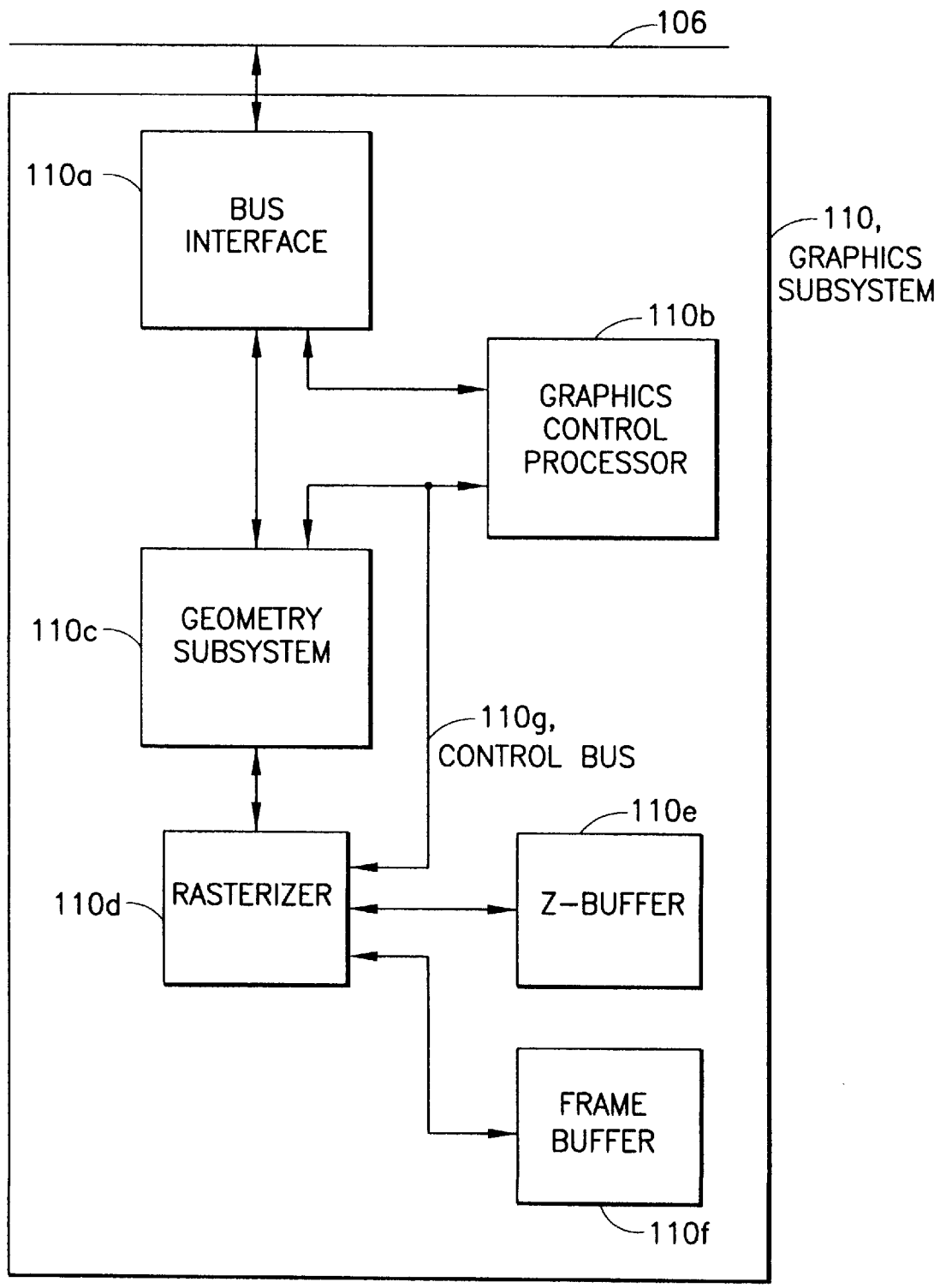
FIG. 2A shows in greater detail the graphics subsystem block of FIG. 1.

More specifically, and referring to FIG. 2A, the graphics subsystem 110 includes a control unit or graphics control processor 110b that supervises the operation of the graphics subsystem 110. Upon receiving a graphics order to render a scene, the control unit or graphics control processor 110b passes the graphics data associated with the graphics order on to a rendering engine or geometry subsystem 110c. The rendering engine 110c transforms the graphics data associated with the graphics order from the model coordinate system to a view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage 110d that converts the transformed primitives into pixels, and generally stores each primitive's contribution at each pixel. The rendering engine 110c may be organized in a variety of architectures. A more detailed discussion of such architectures may be found in Foley et. al., "Computer Graphics: Principles and Practice", pp. 855–920 (2nd Ed. 1990). In a presently preferred embodiment the rendering engine 110c is implemented as a SIMD processor.

As is conventional, a frame buffer 110f stores pixel data that represents the color for each pixel of the display device 112 of FIG. 1. The pixel data is periodically output from the frame buffer 110f for display on the display device 112. Preferably, the frame buffer 110f is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in a Z-buffer 110e represent the depth of the object visible at that pixel.

The graphics subsystem 110 may include two frame buffers, wherein one of the frame buffers serves as the active display portion, while the other frame buffer is updated for subsequent display. Either frame buffer may change from being active to inactive in accordance with the needs of the system 100; the particular manner in which the changeover is accomplished is not relevant to the present invention.

Moreover, if the organization of the frame buffer 110f does not correspond to the display area of the display device 112, a scaling operation can be performed on the pixel values stored in the frame buffer 110*f*, thereby shrinking or enlarging the image stored in the frame buffer. Scaling up may be obtained by duplicating pixel color values or by performing linear or bilinear interpolations between color values to fill gaps between the original pixel values stored in the frame buffer 1110*f*. Scaling down may be obtained by averaging color values of adjacent pixels.

Discussing FIG. 2A now in greater detail, the common graphics subsystem 110 includes the graphics control processor 110*b* that supervises the operation of the graphics subsystem 110. The graphics control processor 110*b* controls the operations performed by the other elements of the graphics subsystem 110 via a control bus 110*g*. The graphics subsystem 110 attaches to the system bus 106 via a bus interface 11*a*, which reads data from and writes data to the system bus 106 in accordance with the communication protocol of the system bus 106.

The graphics subsystem 110 includes the geometry subsystem 110*c* and the rasterizer 110*d* coupled to the bus interface 110*a*. The rasterizer 110*d* is coupled to the Z-buffer 110*e* and the frame buffer 110*f*. The geometry subsystem 110*c* performs transformation and clipping operations on the graphics data. More specifically, the geometry subsystem 110*c*, if need be, transforms the graphics data from the intrinsic coordinate system of the model as stored in the system memory 104 into a world coordinate system. This may be done by transforming the vertices of each primitive with a single transformation matrix that is the concatenation of a plurality of modeling transformation matrices. In addition, one or more surface normal vectors associated with each primitive or vertex (depending upon the shading method to be applied) may need to be transformed.

The geometry subsystem 110*c* may also perform a viewing transformation on each primitive which transforms the coordinates of the primitive from the world coordinate system to a view coordinate system. The origin of the view coordinate system preferably lies in the center of the viewing window. In the case where the graphics data is composed of vertices of triangles, the viewing transformation operation results in a list of the vertices of the triangles in the view coordinate system. In addition, the geometry subsystem 110*c* also preferably performs a perspective projection on the view coordinates of each primitive to provide for perspective foreshortening. A more detailed description of the transformation operations of the geometry subsystem 110*c* may be found in Foley, Van Dam, Feiner and Hughes, Computer Graphics Principles and Practice, pp. 201–281, 866–869 (2nd Ed. 1990).

The geometry subsystem 110*c* may also perform a clipping operation, wherein the primitives are clipped against a clipping volume to define those portions of the transformed primitives that are potentially visible. In addition, the geometry subsystem 110*c* maps the coordinates of the vertices of the primitives output from the clipping operation to a normalized device coordinate system as required by the rasterizer 110*d*. The result of this step in the rendering pipeline is a list of vertices in the normalized device coordinate system that describe potentially visible portions of the primitives. A more detailed description of the clipping operation may be found in Foley, Van Dam, Feiner and Hughes, Computer Graphics Principles and Practice, pp. 110–132, 924–945, 869–870 (2nd Ed. 1990).

In addition, the graphics subsystem 110 may perform lighting calculations that simulate the effects of light sources on the surfaces of the objects of the three-dimensional view/model. Typically, the lighting calculations depend upon (a) the properties of the viewer, (b), the properties of the objects being rendered, and (c) the properties of one or more light sources. Properties of the viewer may include the position of the viewer with respect to the objects being rendered. The properties of the objects may include the location and normal vector of each vertex of the triangles that define the objects. And the properties of the light sources depend upon the type (ambient, directional, spotlight, etc.) and may include intensity, color, direction, attenuation factors, and cone angle). A more detailed description of the steps for carrying out such lighting calculations may be found in Foley, Van Dam, Feiner and Hughes, Computer Graphics Principles and Practice, pp. 721–814 (2nd Ed. 1990).

Typically, lighting calculations are performed once during the rendering process for every vertex of the triangles of the objects of the view. Thus, lighting calculations may be performed by the geometry subsystem 110*c*. However, the lighting calculations may be calculated for every pixel. Typically, this is accomplished in conjunction with shading calculations performed by the rasterizer 110*d*. In this case, the lighting calculations are embedded into the shading calculations performed by the rasterizer 110*d*.

The operation of the rasterizer 110*d* may be divided into three tasks: scan conversion, shading, and visibility determination. Scan conversion decomposes the potentially visible portion of the primitives into individual pixels. Shading computes the colors of each pixel. And visibility determination utilizes the z coordinate (or depth value) of the primitive at each pixel to compute the set of pixels which are "visible" for the primitive. Thus, for each pixel covered by a potentially visible portion of a primitive, the rasterizer 110*d* produces pixel information, e.g. color and depth of the primitive, and when appropriate writes the color information and depth of the primitive at the given pixel to the corresponding location in the frame buffer 110*f* and Z-buffer 110*e*, respectively. A more detailed description of the operation of the rasterizer 110*d* may be found in Foley, Van Dam, Feiner and Hughes, Computer Graphics Principles and Practice, pp. 649–720, 870–871 (2nd Ed. 1990), and in U.S. Pat. No. 4,805,116 to B. C. Liang et al., which is commonly assigned to the assignee of the present invention, herein incorporated by reference in its entirety.

As was described previously, in a SIMD (Single Instruction Multiple Data) machine, several processors execute the same instruction but operate on a different partition of the data, as shown in FIG. 4. The processors operate in a lockstep fashion. Since the processors access the same memory it is essential to have high bandwidth to the memory and to also minimize the contention for the same memory locations. SIMD technology is preferred in that it often offers the lowest cost approach.

Also as was described above, the operations 1/x and 1/sqrt(x) occur very frequently in the geometry processing part of the graphics pipeline. The 1/x operation is used for perspective projection of geometric objects, texture mapping, and for color and the other parameter slope calculations, while the 1/sqrt(x) operation is used to normalize vectors that are used in performing the lighting calculations. These operations are executed once per vertex and collectively consume a significant portion of the overall vertex processing time. Thus, it is important to execute the 1/x and 1/sqrt(x) operations efficiently to speed up the vertex processing rate in the geometry pipeline of the graphics subsystem 110 of FIGS. 1 and 2A.

The ROM based lookup tables that were mentioned previously provide approximate seeds, followed by Newton Raphson iterations, and have been used to speed up the computation of the 1/x and 1/sqrt x operations. These techniques work well for traditional computer architectures, but are less suitable for a SIMD architecture since every processor in the SIMD array may need access to a different element of the lookup table simultaneously. Access to the lookup table is thus serialized and processors may wait idly for several cycles for their turn to access the lookup table, thereby wasting valuable computing resources. With the dramatic increases in processor clock rates and the relatively modest growth of memory access speeds, this problem is expected to worsen with time. One further drawback of this approach is that the total resources wasted increases as more processors are added to the SIMD array.

Presently preferred embodiments of this invention will now be described.

The Newton Raphson iteration formulas for the $1/x$ and $1/\sqrt{x}$ operations are first derived below.

By Taylor's theorem, if $f(x)=1/x$, $$f(x) = f(x_0) + f'(x_0)(x - x_0) + \frac{1}{2!}f''(x_0)(x - x_0)^2 + \ldots$$

$$1/x = 1/x_0 + f'(x_0)(x - x_0) + \frac{1}{2!}f''(x_0)(x - x_0)^2 + \ldots$$

$$= R_0 + f'(x_0)(x - 1/R_0) + \frac{1}{2!}f''(x_0)(x - 1/R_0)^2 + \ldots$$

where $R_0$ is a value stored in the lookup table for an input of $x_0$.

Using only the first two terms $$1/x \approx R_0 - R_0^2(x - 1/R_0) = R_1$$

$$R_1 = 2R_0 - R_0^2 x = R_0(2 - R_0 x)$$

$$R_2 = 2R_1 - R_1^2 x = R_1(2 - R_1 x)$$

The last of the above set of equations results by using the newly computed $R_1$ as an improved starting approximation, and applying the same technique again, thereby iterating the calculation.

FIG. 5 is a geometric interpretation of the foregoing formula.

With the first three terms from the Taylor series for $1/x$, we have $$R_1 = 3R_0 - 3R_0^2 x + R_0^3 x = R_0(3(1 - R_0 x) + R_0^2 x^2)$$

$$R_2 = 3R_1 - 3R_1^2 x + R_1^3 x = R_1(3(1 - R_1 x) + R_1^2 x^2)$$

Now a derivation of the iteration steps for $1/\sqrt{x}$ is described. By Taylor's theorem, if $f(x)=1/\sqrt{x}$, $$f(x) = f(x_0) + f'(x_0)(x - x_0) + \frac{1}{2!}f''(x_0)(x - x_0)^2 + \ldots$$

$$1/\sqrt{x} = 1/\sqrt{x_0} + f'(x_0)(x - x_0) + \frac{1}{2!}f''(x_0)(x - x_0)^2 + \ldots$$

$$= R_0 + \frac{1}{2}x_0^{-3/2}(x - x_0) + \frac{1}{2!}\frac{3}{4}x_0^{-5/2}(x - x_0)^2 + \ldots$$

So, using only the first two terms from the above series, $$1/\sqrt{x} \approx R_0 - \frac{1}{2}R_0^3(x - 1/R_0^2)$$

$$R_1 = 0.5(3R_0 - xR_0^3) = 0.5R_0(3 - R_0^2 x)$$

$$R_2 = 0.5(3R_1 - xR_1^3) = 0.5R_1(3 - R_1^2 x)$$

Using the first three terms of the Taylor series, the following results $$R_1 = 1.875R_0 - 1.25xR_0^3 + 0.375x^2 R_0^5$$

$$= R_0(1.875 - 1.25xR_0^2 + 0.375(xR_0^2)^2)$$

$$R_2 = 1.875R_1 - 1.25xR_1^3 + 0.375x^2 R_1^5$$

$$= R_1(1.875 - 1.25xR_1^2 + 0.375(xR_1^2)^2)$$

For both $1/x$ and $1/\sqrt{x}$, using the first two terms of the Taylor series is preferred, since using the available computer cycles for subsequent iterations provides a faster convergence, as compared to using the cycles to generate a better seed.

The Newton Raphson iterations have dependent operations, i.e., results from one step need to be obtained completely before the next step can start. This presents a problem when processors have deep pipelines for arithmetic units. A method to mitigate this problem, although at the expense of accuracy, was provided by Goldshmidt, and is given by the following Goldshmidt iterative technique:

$D_0=x; N_0=1.0;$ $D_1=D_0 \times R_0; N_1=N_0 \times R_0; R_1=2.0-D_1$ $D_2=D_1 \times R_1; N_2=N_1 \times R_1; R_2=2.0-D_2$ The 2–x operation is performed in ones complement arithmetic by a simple bit reversal, and without a full subtraction.

In accordance with the teaching of this invention, circuitry is provided in each processor to generate the lookup table output on the fly. A preferred embodiment of the seed logic is described below. The additional logic to implement the seed logic is of the order of a few tens of gates, and therefore is relatively small as compared to the overall circuitry in the processor.

A (32 bit) floating point number is represented as shown in FIG. 6, and evaluates to $(-1)^s \times 1.f \times 2^{e-127}$.

Therefore, the reciprocal of a floating point number is $$\frac{1}{(-1)^s \times 1 \cdot f \times 2^{e-127}} = (-1)^s \times 1 \cdot g \times 2^{h-127},$$

where $g = \frac{2}{1 \cdot f} - 1$ and $h = 253 - e$.

FIG. 7 illustrates the floating point representation of the input and output.

If a k bit lookup table is used then $2_k$ entries are provided, indexed by the k MSBs of the mantissa f. The g corresponding to the i-th mantissa table entry is given by $$\frac{2^{2k+1}}{2^k + 1 + i} - 2^k.$$

Therefore, the reciprocal square root of a number is $$\frac{1}{\sqrt{(-1)^s \times 1 \cdot f \times 2^{e-127}}} = (-1)^s \times 1 \cdot g \times 2^{h-127},$$

where $g = \frac{2}{\sqrt{1 \cdot f}} - 1$ and $h = \frac{379 - e}{2}$, under the assumption that the sign s is zero.

The cases of odd and even exponents must be distinguished. In the past this has been done by using two sets of tables, one for odd exponents and one for even exponents.

However, in order to reduce the overall table size and provide only one table, the following technique is preferred.

The reciprocal square root of a floating point number is $$\frac{1}{\sqrt{(-1)^s \times 1 \cdot f \times 2^{e-127}}} = (-1)^s \times p \times 1 \cdot g \times 2^{h-127},$$

where $g = \frac{2}{\sqrt{1 \cdot f}} - 1$, and $h = \left\lfloor \frac{379-e}{2} \right\rfloor$, and $p = \sqrt{2}$ if (e−127) is even and p=1 if (e−127) is odd (under the assumption that s is zero).

In accordance with this technique, for a k bit table there are $2_k$ entries, indexed by the k MSBs of the mantissa f. The g corresponding to the i-th mantissa table entry is given by $$\frac{2^{\frac{3k}{2}+1} \times q}{2^k + 1 + i} - 2^k,$$

where $q=\sqrt{2}$ if k is odd and q=1 if k is even.

Figure 8A:
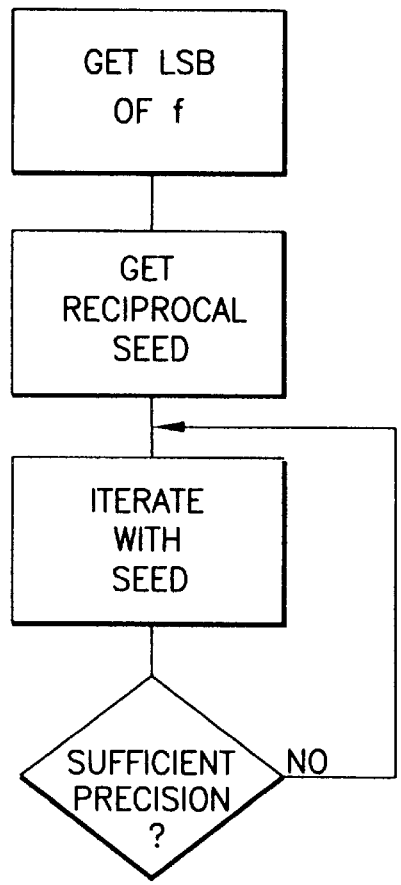
FIG. 8a is a logic flow diagram for a reciprocal operation.
Figure 8B:
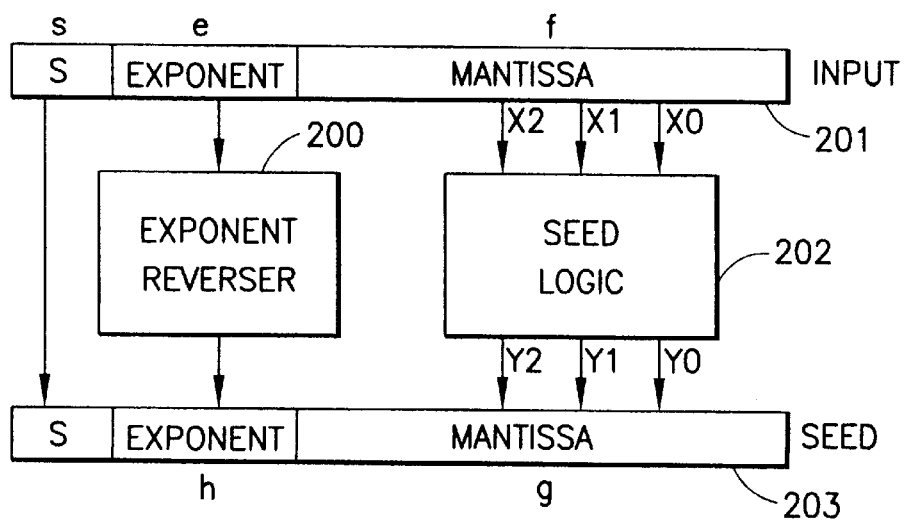
FIG. 8B is a logic diagram showing seed generation for reciprocals in accordance with this invention.

FIG. 8A illustrates the flow of reciprocal computation for the case of 1/x, while FIG. 8B illustrates the seed generation logic.

Flow for reciprocal computation in a four processor (P0–P3) SIMD machine is as follows:
Inputs: I3, I2, I1, I0
I3 is on P3, I2 is on P2, I1 is on P1, I0 is on P0
Outputs: Q3, Q2, Q1, Q0
P3 computes Q3, P2 computes Q2, and so on
Q3=1/I3, Q2=1/I2, Q1=1/I1, Q0=1/I0
Algorithm:
For each input I in I3, I2, I1, I0
compute an n-bit (e.g., n=3) seed
iterate m (e.g., m=3) times:: new_seed=seed (2.0−seed*I)
seed=new_seed
output result Q The seed generation operation is as follows:
sign of seed=sign of input
exponent, h, for seed=127−e (exponent for input data) for 1/x, or (379−e)/2 for 1/sqrt(x)
mantissa, g, for seed is generated by seed table circuit,
inputs to seed table circuit are n MS bits of mantissa of input data,
outputs of seed table circuit are n MS bits of mantissa of seed.
So, seed=[(−1)**s]*(1+g)*(2(h−127)), where  indicates exponentiation.

The exponent reverser 200 of FIG. 8B implements the h=253−e operation that was described above.

The seed table implementation in accordance with this invention will next be described. For uniprocessor solutions, lookup tables have been used both for the exponents and mantissas. By example, a 256 entry 8-bit table is used for the exponent and a 2048 entry 11-bit table is used for the mantissa. As can be appreciated, these lookup tables are too large to duplicate in each arithmetic unit of a SIMD machine.

The preferred approach, in accordance with this invention, makes the tables small so that they can be efficiently generated by logic circuitry, thereby removing the need to store the values in a ROM table. Furthermore, no table is used for the exponent portion. Instead, the exponent portion of the result is preferably computed using the arithmetic units. For the mantissa portion, each arithmetic unit in the SIMD machine includes circuitry to generate the mantissa table on the fly.

A description is now made of 3-bit and 4-bit mantissa seed tables, and the logic necessary to generate the tables is derived.

Based on the previous description, a 3-bit mantissa table for 1/x is shown in Table 1.

TABLE 1

| | 3 bit table for 1/x | | | | | | |
|---|---|---|---|---|---|---|---|
| 3 MS bits of f | Binary Representation | | | Table Entry | Binary Representation | | |
| Index | X2 | X1 | X0 | Result | Y2 | Y1 | Y0 |
| 0 | 0 | 0 | 0 | 6 | 1 | 1 | 0 |
| 1 | 0 | 0 | 1 | 4 | 1 | 0 | 0 |
| 2 | 0 | 1 | 0 | 3 | 0 | 1 | 1 |
| 3 | 0 | 1 | 1 | 2 | 0 | 1 | 0 |
| 4 | 1 | 0 | 0 | 1 | 0 | 0 | 1 |
| 5 | 1 | 0 | 1 | 1 | 0 | 0 | 1 |
| 6 | 1 | 1 | 0 | 0 | 0 | 0 | 0 |
| 7 | 1 | 1 | 1 | 0 | 0 | 0 | 0 |

Suitable logic to generate the above table is as follows, expressed in Boolean form:

$Y_0 = X_2\overline{X_1} + \overline{X_2}X_1\overline{X_0}$ $Y_1 = \overline{X_2}X_1 + \overline{X_2}\overline{X_0}$ $Y_2 = \overline{X_2}\overline{X_1}$ Based on the previous description, a 3-bit mantissa table for $1/\sqrt{x}$ is shown in Table 2.

TABLE 2

| | 3 bit table for 1/√x | | | | | | |
|---|---|---|---|---|---|---|---|
| 3 MS bits of f | Binary Representation | | | Table Entry | Binary Representation | | |
| Index | X2 | X1 | X0 | Result | Y2 | Y1 | Y0 |
| 0 | 0 | 0 | 0 | 7 | 1 | 1 | 1 |
| 1 | 0 | 0 | 1 | 6 | 1 | 1 | 0 |
| 2 | 0 | 1 | 0 | 5 | 1 | 0 | 1 |
| 3 | 0 | 1 | 1 | 5 | 1 | 0 | 1 |
| 4 | 1 | 0 | 0 | 4 | 1 | 0 | 0 |
| 5 | 1 | 0 | 1 | 4 | 1 | 0 | 0 |
| 6 | 1 | 1 | 0 | 3 | 0 | 1 | 1 |
| 7 | 1 | 1 | 1 | 3 | 0 | 1 | 1 |

Suitable logic to generate the above table is as follows:

$Y_0 = X_1 + \overline{X_2 X_0}$ $Y_1 = \overline{X_2}X_1 + X_2 X_1$ $Y_2 = \overline{X_2} + \overline{X_1}$ Based on the previous description, a 4-bit mantissa table for 1/x is shown in Table 3.

TABLE 3

4 bit table for 1/x

| 4 MS bits of f | Binary Representation | | | | Table Entry | Binary Representation | | | |
|---|---|---|---|---|---|---|---|---|---|
| Index | X3 | X2 | X1 | X0 | Result | Y3 | Y2 | Y1 | Y0 |
| 0 | 0 | 0 | 0 | 0 | 14 | 1 | 1 | 1 | 0 |
| 1 | 0 | 0 | 0 | 1 | 12 | 1 | 1 | 0 | 0 |
| 2 | 0 | 0 | 1 | 0 | 10 | 1 | 0 | 1 | 0 |
| 3 | 0 | 0 | 1 | 1 | 9 | 1 | 0 | 0 | 1 |
| 4 | 0 | 1 | 0 | 0 | 8 | 1 | 0 | 0 | 0 |
| 5 | 0 | 1 | 0 | 1 | 7 | 0 | 1 | 1 | 1 |
| 6 | 0 | 1 | 1 | 0 | 6 | 0 | 1 | 1 | 0 |
| 7 | 0 | 1 | 1 | 1 | 5 | 0 | 1 | 0 | 1 |
| 8 | 1 | 0 | 0 | 0 | 4 | 0 | 1 | 0 | 0 |
| 9 | 1 | 0 | 0 | 1 | 3 | 0 | 1 | 1 | 1 |
| 10 | 1 | 0 | 1 | 0 | 2 | 0 | 0 | 1 | 0 |
| 11 | 1 | 0 | 1 | 1 | 2 | 0 | 0 | 1 | 0 |
| 12 | 1 | 1 | 0 | 0 | 1 | 0 | 0 | 0 | 1 |
| 13 | 1 | 1 | 0 | 1 | 1 | 0 | 0 | 0 | 1 |
| 14 | 1 | 1 | 1 | 0 | 0 | 0 | 0 | 0 | 0 |
| 15 | 1 | 1 | 1 | 1 | 0 | 0 | 0 | 0 | 0 |

Suitable logic to generate the above table is as follows:

$Y_0 = \overline{X_3}X_1X_0 + X_2\overline{X_1}X_0 + X_3\overline{X_1}X_0 + X_3X_2\overline{X_1}$ $Y_1 = \overline{X_3}X_2\overline{X_1}X_0 + \overline{X_3}X_2X_0 + \overline{X_3}X_1\overline{X_0} + X_3\overline{X_2}X_0 + X_3\overline{X_2}X_1$ $Y_2 = \overline{X_2}\overline{X_1}X_0 + \overline{X_3}X_1X_0 + \overline{X_3}X_2X_1$ $Y_3 = \overline{X_3}\overline{X_2} + \overline{X_3}X_1X_0$ Based on the previous description, a 4-bit mantissa table for $1/\sqrt{x}$ is shown in Table 4.

TABLE 4

4 bit table for $1/\sqrt{x}$

| 4 MS bits of f | Binary Representation | | | | Table Entry | Binary Representation | | | |
|---|---|---|---|---|---|---|---|---|---|
| Index | X3 | X2 | X1 | X0 | Result | Y3 | Y2 | Y1 | Y0 |
| 0 | 0 | 0 | 0 | 0 | 15 | 1 | 1 | 1 | 1 |
| 1 | 0 | 0 | 0 | 1 | 14 | 1 | 1 | 1 | 0 |
| 2 | 0 | 0 | 1 | 0 | 13 | 1 | 1 | 0 | 1 |
| 3 | 0 | 0 | 1 | 1 | 12 | 1 | 1 | 0 | 0 |
| 4 | 0 | 1 | 0 | 0 | 11 | 1 | 0 | 1 | 1 |
| 5 | 0 | 1 | 0 | 1 | 11 | 1 | 0 | 1 | 1 |
| 6 | 0 | 1 | 1 | 0 | 10 | 1 | 0 | 1 | 0 |
| 7 | 0 | 1 | 1 | 1 | 10 | 1 | 0 | 1 | 0 |
| 8 | 1 | 0 | 0 | 0 | 9 | 1 | 0 | 0 | 1 |
| 9 | 1 | 0 | 0 | 1 | 9 | 1 | 0 | 0 | 1 |
| 10 | 1 | 0 | 1 | 0 | 8 | 1 | 0 | 0 | 0 |
| 11 | 1 | 0 | 1 | 1 | 8 | 1 | 0 | 0 | 0 |
| 12 | 1 | 1 | 0 | 0 | 7 | 0 | 1 | 1 | 1 |
| 13 | 1 | 1 | 0 | 1 | 7 | 0 | 1 | 1 | 1 |
| 14 | 1 | 1 | 1 | 0 | 6 | 0 | 1 | 1 | 0 |
| 15 | 1 | 1 | 1 | 1 | 6 | 0 | 1 | 1 | 0 |

Suitable logic to generate the above table is as follows:

$Y_0 = \overline{X_3}\overline{X_2}\overline{X_0} + X_2\overline{X_1} + X_3\overline{X_1}$ $Y_1 = \overline{X_3}\overline{X_1} + X_2$ $Y_2 = \overline{X_3}\overline{X_2} + X_3X_2$ $Y_3 = \overline{X_3} + \overline{X_2}$ A simulation was performed, wherein the mantissa table sizes and the numbers of iterations were varied, and a determination of the maximum relative error for each combination was made. The results are shown in the following Tables 5 and 6.

TABLE 5

Errors for 1/x

| Table Width (bits) | Number of iterations | Max Relative Error |
|---|---|---|
| 2 | 2 | −3.9063e − 003 |
| 2 | 3 | −1.5290e − 005 |
| 2 | 4 | −9.5088e − 008 |
| 2 | 5 | 0.0000e + 000 |
| 3 | 2 | −5.9608e − 004 |
| 3 | 3 | −4.0276e − 007 |
| 3 | 4 | 0.0000e + 000 |
| 4 | 2 | −5.4532e − 005 |
| 4 | 3 | −1.1307e −0 007 |
| 4 | 4 | 0.0000e + 000 |
| 5 | 2 | −3.4684e − 006 |
| 5 | 3 | −6.1527e − 008 |
| 5 | 4 | 0.0000e + 000 |
| 6 | 2 | −2.7669e − 007 |
| 6 | 3 | 0.0000e + 000 |
| 7 | 2 | −1.1874e − 007 |
| 7 | 3 | 0.0000e + 000 |
| 8 | 2 | −1.1874e − 007 |
| 8 | 3 | 0.000e + 000 |
| 12 | 2 | 0.0000e + 000 |

TABLE 6

Table of errors for $1/\sqrt{x}$

| Table Width (bits) | No. of iterations | Max Relative Error |
|---|---|---|
| 2 | 2 | −2.6586e − 003 |
| 2 | 3 | −1.0645e − 005 |
| 2 | 4 | −1.1439e − 007 |
| 2 | 5 | 0.0000e + 000 |
| 3 | 2 | −2.2241e − 004 |
| 3 | 3 | −1.3343e − 007 |
| 3 | 4 | 0.0000e + 000 |
| 4 | 2 | −3.8206e − 005 |
| 4 | 3 | −1.1805e − 007 |
| 4 | 4 | 0.0000e + 000 |
| 5 | 2 | −2.5721e − 006 |
| 5 | 3 | −6.8120e − 008 |
| 5 | 4 | 0.0000e + 000 |
| 6 | 2 | −2.3386e − 007 |
| 6 | 3 | 0.0000e + 000 |
| 7 | 2 | −1.1880e − 007 |
| 7 | 3 | 0.0000e + 000 |
| 8 | 2 | −1.1817e − 007 |
| 8 | 3 | 0.0000e + 000 |
| 12 | 2 | 0.0000e + 000 |

It should noted that the improvement in relative error is much greater when three iterations are used, and when going from the 2-bit table to the 3-bit table, than when going from the 3-bit table to the 4-bit table. The presently preferred embodiment uses either three iterations with 3-bit tables or two iterations with 4-bit tables. The choice depends on the cycle count and the amount of error that can be tolerated in a given application.

Figure 2B:
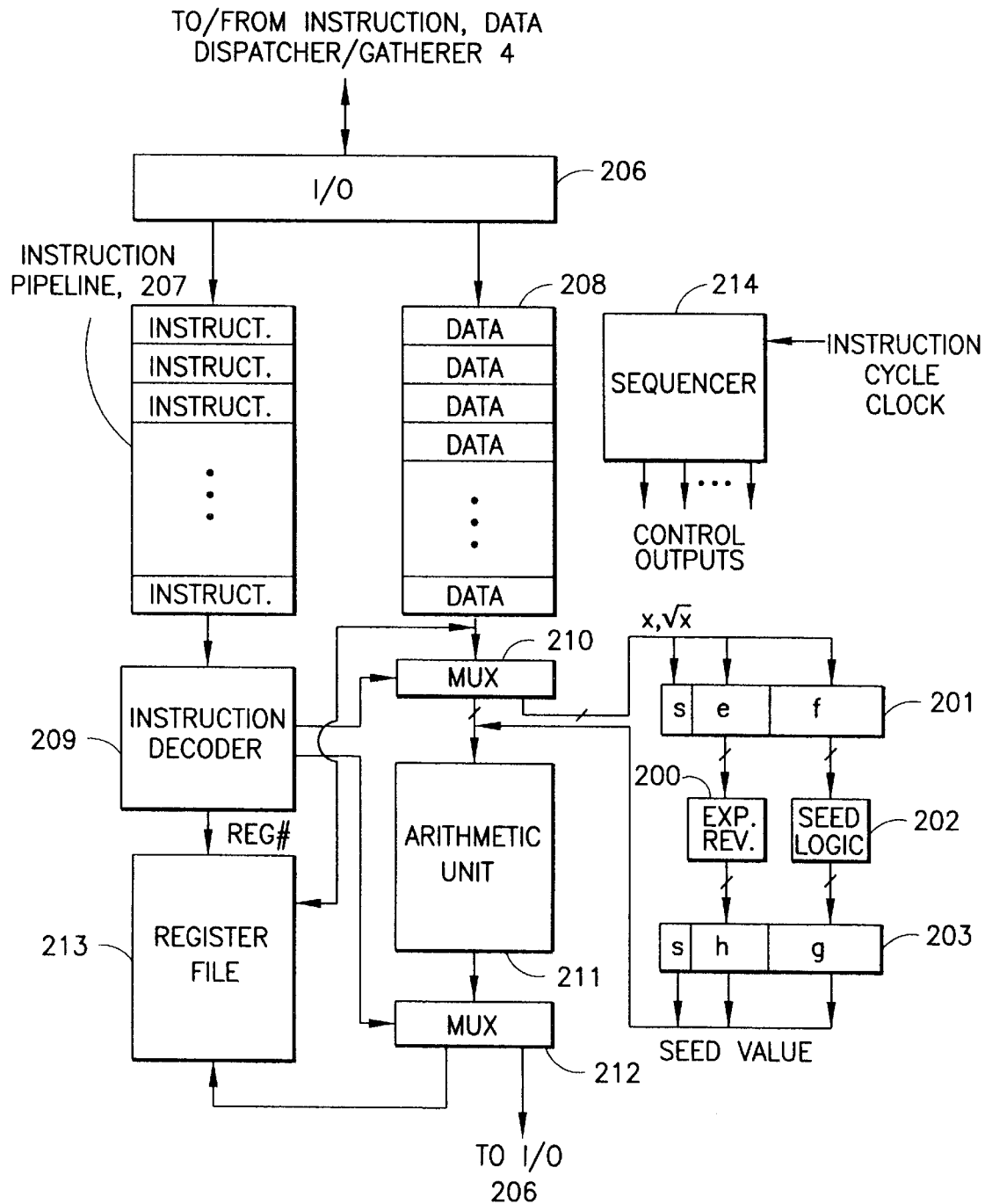
FIG. 2B is a simplified block diagram that illustrates one SIMD processor in accordance with this invention.
Figure 3:
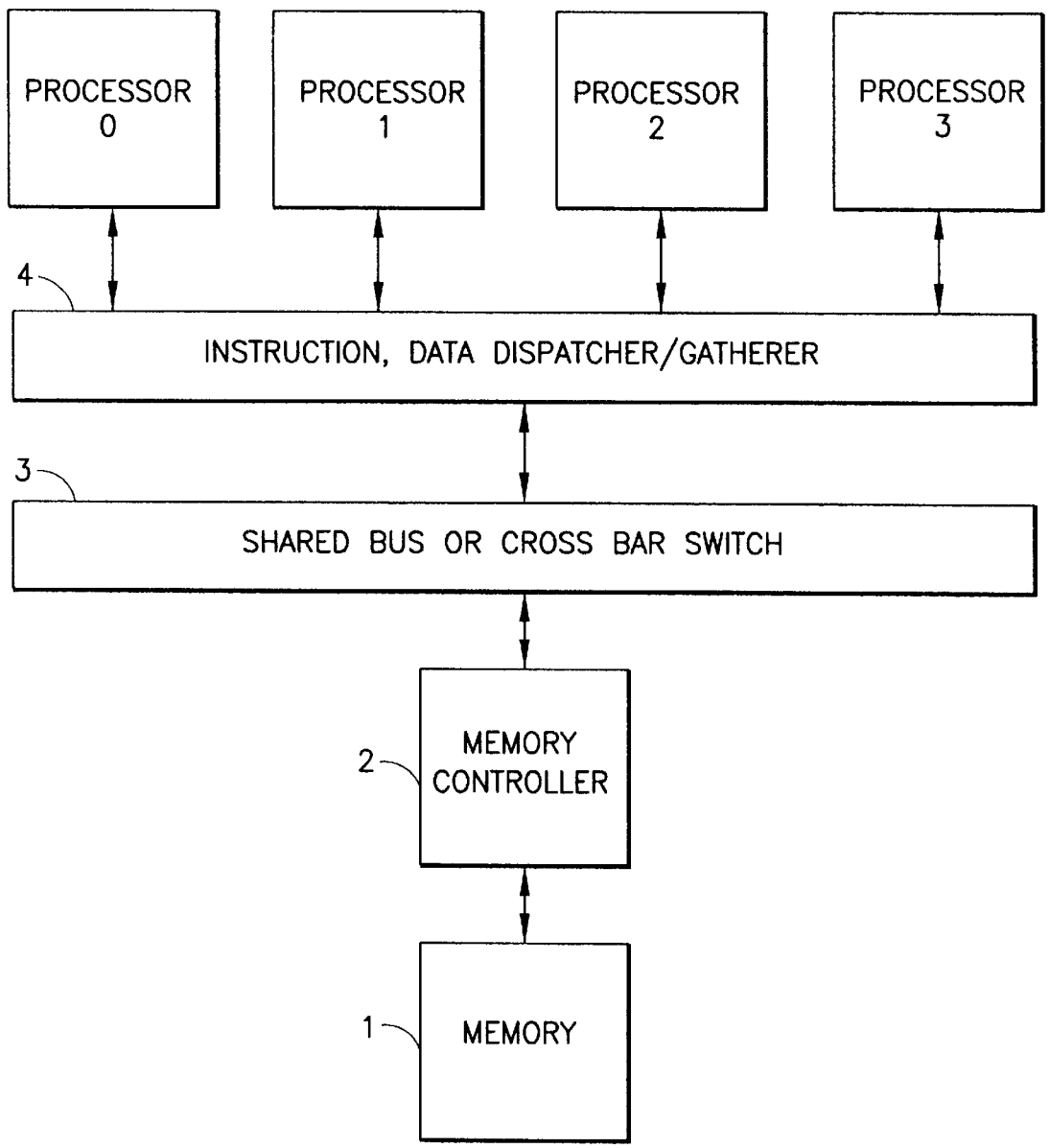
FIG. 3 is a high level block diagram of a conventional SIMD machine that is suitable for graphics processing.

Reference is now made to FIG. 2B for illustrating the seed logic generation circuit of FIG. 8B in an exemplary embodiment of a SIMD processor, such as one of the processors P0–P3 of FIG. 3. The SIMD processors employed to implement the graphics subsystem 110, in particular the geometry subsystem 110c and possibly also all or part of the rasterizer 110d.

The proocessor includes an instruction pipeline 207 and a corresponding data pipeline 208 which are coupled to an I/O block 206. By example, the instruction pipeline 207 may include storage for four to six instructions. An output of the instruction pipeline 207 provides an instruction to be executed to an instruction decoder 209. The instruction decoder 209 is responsive to an instruction of the form 1/x or 1/sqrt x for controlling a data multiplexer 210 to route the floating point data value to the floating point input register 201. Data associated with other instruction types (e.g., multiply, add, subtract, etc.) is routed instead directly to an arithmetic unit 211. The data value that is routed to the input floating point register 201 is processed and output from the exponent reverser 200 and the seed logic block 202, and the result is provided to the output floating point register 203, which thus contains a seed value (i.e., an initial estimate of 1/x or 1/sqrt(x) generated in accordance with this invention). The generated seed value is supplied to the input of the arithmetic unit 211 for iterative processing as described above (e.g., three iterations with a 3-bit seed table or two iterations with a 4-bit seed table). The end result is a calculated value of 1/x or 1/sqrt(x) having a desired accuracy. A further multiplexer 212 is provided at the output of the arithmetic unit 211 for routing the result to either an instruction-specified register in a register file 213, or back to the I/O block 206 for storage in the system memory 104.

In practice only a few MSBs of the mantissa need to be provided to the input register (e.g., three or four bits), and not the entire mantissa. The output of the seed logic 202 is then appended with zeroes and provided to the arithmetic unit for performing the first iteration.

It can be realized that the multiplexer 210 can be used to connect the input of the seed logic block 202 to the output of the register file 213, instead of the data pipeline 208, depending on the source of the data.

A sequencer 214 operates off of an instruction cycle clock to provide control outputs to the processor circuitry to insure the correct microsequencing of the various logic blocks on an instruction by instruction basis.

One or both of the registers 201 and 203 may be optional in some embodiments, depending on the clock speed, the propagation delay through the combinatorial seed logic block 202, and other factors. Also, in some embodiments the function of the exponent reverser 200 may be implemented by the arithmetic unit 211, and thus not provided as the separate logic block 200. In either case the exponent reverser performs the (127−e) operation for 1/x, and (379−e)/2 for 1/sqrt(x), as shown in FIG. 8B.

While the invention has been particularly shown and described in respect to preferred embodiments thereof, it will be understood by those skilled in the art that changes in form and details may be made therein without departing from the scope and spirit of the invention.

What is claimed is:

1. A data processor, comprising:
   a memory for storing graphics data, wherein portions of the graphics data are expressed in floating point format having a sign field, an exponent field, and a mantissa field; and
   a graphics processor coupled to said memory for preparing the graphics data for display, said graphics processor comprising a plurality of processors organized in a SIMD architecture, each of said processors comprising circuitry for extracting an exponent for its associated portions of the graphics data and for performing reciprocal operations on those portions of the graphics data expressed in floating point format, each of said processors comprising a combinatorial logic circuit having inputs coupled to the memory for inputting the portions of the graphics data, said logic circuit having outputs providing a seed value based upon the inputted portions of the graphics data.

2. A data processor as in claim 1, wherein each of said processors comprises an exponent reverser that implements a (127−e) operation, where e is the exponent field of an input floating point formatted graphics data value of a reciprocal operation of the form 1/x.

3. A data processor as in claim 1, wherein each of said processors comprises an exponent reverser that implements a (379−e)/2 operation, where e is the exponent field of an input floating point formatted graphics data value of a reciprocal operation of the form 1/sqrt(x).

4. A data processor as in claim 1, wherein said reciprocal operation is of the form 1/x.

5. A data processor as in claim 1, wherein said reciprocal operation is of the form 1/sqrt(x).

6. A data processor, comprising:
   a memory for storing graphics data, wherein portions of the graphics data are expressed in floating point format having a sign field, an exponent field, and a mantissa field; and
   a graphics processor coupled to said memory for preparing the graphics data for display, said graphics processor comprising a plurality of processors organized in a SIMD architecture, each of the said processors performing reciprocal operations on those portions of the graphics data expressed in floating point format, each of said processors comprising a combinatorial logic circuit having inputs coupled to the memory for inputting the portions of the graphics data, said logic circuit having outputs providing a seed value based upon the inputted portions of the graphics data;
   wherein said logic circuits comprise a seed logic block having n inputs coupled to n MSBs of an input mantissa field (f) portion of graphics data, and n outputs coupled to n MSBs of an output mantissa field (g).

7. A data processor as in claim 6, wherein n is equal to or greater than three.

8. A data processor as in claim 6, wherein in each of said processors at least said output mantissa field is coupled to an input of an arithmetic unit for providing the seed value thereto, and wherein said arithmetic unit operates under the central of microcode to iteratively refine a result of the reciprocal operation starting with the seed value.

9. A data processor as in claim 8, wherein each of said arithmetic units operates in accordance with a Goldshmidt iterative technique.

10. A data processor as in claim 6, wherein n=4.

11. A data processor as in claim 6, wherein n=3, wherein said reciprocal operation is of the form 1/x, wherein said three MSBs of the input mantissa field are designated X2, X1 and X0, where X2 is the MSB, wherein said three outputs are designated Y2, Y1 and Y0, and wherein said logic circuit is constructed to implement:

$$Y_0 = X_2\overline{X_1} + \overline{X_2}X_1\overline{X_0}$$

$$Y_1 = \overline{X_2}X_1 + \overline{X_2 X_0}$$

$$Y_2 = \overline{X_2 X_1}.$$

12. A data processor as in claim 6, wherein n=3, wherein said reciprocal operation is of the form 1/sqrt(x), wherein said three MSBs of the input mantissa field are designated X2, X1 and X0, where X2 is the MSB, wherein said three outputs are designated Y2, Y1 and Y0, and wherein said logic circuit is constructed to implement:

$Y_0 = X_1 + \overline{X_2 X_0}$ $Y_1 = \overline{X_2 X_1} + \overline{X_2 X_1}$ $Y_2 = \overline{X_2} + \overline{X_1}$.

13. A data processor as in claim 6, wherein n=4, wherein said reciprocal operation is of the form 1/x, wherein said four MSBs of the input mantissa field are designated X3, X2, X1 and X0, where X3 is the MSB, wherein said four outputs are designated Y3, Y2, Y1 and Y0, and wherein said logic circuit is constructed to implement:

$Y_0 = \overline{X_3} X_1 X_0 + X_2 \overline{X_1} X_0 + X_3 \overline{X_1} X_0 + X_3 X_2 \overline{X_1}$ $Y_1 = \overline{X_3} X_2 \overline{X_1} X_0 + \overline{X_3 X_2 X_0} + \overline{X_3} X_1 \overline{X_0} + X_3 \overline{X_2} X_0 + X_3 \overline{X_2} X_1$ $Y_2 = \overline{X_2 X_1 X_0} + \overline{X_3 X_1} X_0 + \overline{X_3} X_2 X_1$ $Y_3 = \overline{X_3 X_2} + \overline{X_3 X_1 X_0}$.

14. A data processor as in claim 6, wherein n=4, wherein said reciprocal operation is of the form 1/sqrt(x), wherein said four MSBs of the input mantissa field are designated X3, X2, X1 and X0, where X3 is the MSB, wherein said four outputs are designated Y3, Y2, Y1 and Y0, and wherein said logic circuit is constructed to implement:

$Y_0 = \overline{X_3 X_2 X_0} + X_2 \overline{X_1} + X_3 \overline{X_1}$ $Y_1 = \overline{X_3 X_1} + X_2$ $Y_2 = \overline{X_3 X_2} + X_3 X_2$ $Y_3 = \overline{X_3} + \overline{X_2}$.

15. A method for performing graphics data calculations, comprising the steps of:
- executing a reciprocal mathematical operation in parallel on a plurality of data processors, each of said data processors operating or different graphical data expressed in floating point format;
- generating, in each data processor, a seed value for the reciprocal mathematical operation with a combinatorial logic circuit having n inputs coupled to n MSB mantissa bits of the graphical data, the logic circuit having n outputs coupled to an input of an arithmetic unit; and
- iteratively refining the seed value with the arithmetic unit to provide a result.

16. A method as in claim 15, wherein each data processor comprises an exponent reverser that implements one of a 127−e operation or a (379−e)/2 operation, where e is the exponent field of an input floating point formatted graphics data value.

17. A method as in claim 15, wherein n is equal to or greater than three.

18. A method as in claim 15, wherein the reciprocal mathematical operation is of the form 1/x.

19. A method as in claim 15, wherein the reciprocal mathematical operation is of the form 1/sqrt(x).

20. A method as in claim 15, wherein n=4.

21. A method as in claim 15, wherein each of the arithmetic units performs an exponent reversal step having the form 127−e or (379−e)/2, where e is the exponent field of an input floating point formatted graphics data value.

22. A method as in claim 15, wherein n=3, wherein said reciprocal mathematical operation is of the form 1/x, wherein the three MSBs of the input mantissa field are designated X2, X1 and X0, where X2 is the MSB, wherein the three outputs are designated Y2, Y1 and Y0, and wherein the logic circuit is constructed to implement:

$Y_0 = X_2 \overline{X_1} + \overline{X_2} X_1 \overline{X_0}$ $Y_1 = \overline{X_2} X_1 + \overline{X_2 X_0}$ $Y_2 = \overline{X_2 X_1}$.

23. A method as in claim 15, wherein n=3, wherein the reciprocal mathematical operation is of the form 1/sqrt(x), wherein the three MSBs of the input mantissa field are designated X2, X1 and X0, where X2 is the MSB, wherein the three outputs are designated Y2, Y1 and Y0, and wherein the logic circuit is constructed to implement:

$Y_0 = X_1 + \overline{X_2 X_0}$ $Y_1 = \overline{X_2 X_1} + X_2 X_1$ $Y_2 = \overline{X_2} + \overline{X_1}$.

24. A method as in claim 15, wherein n=4, wherein the reciprocal mathematical operation is of the form 1/x, wherein the four MSBs of the input mantissa field are designated X3, X2, X1 and X0, where X3 is the MSB, wherein the four outputs are designated Y3, Y2, Y1 and Y0, and wherein the logic circuit is constructed to implement:

$Y_0 = \overline{X_3} X_1 X_0 + X_2 \overline{X_1} X_0 + X_3 \overline{X_1} X_0 + X_3 X_2 \overline{X_1}$ $Y_1 = \overline{X_3} X_2 \overline{X_1} X_0 + \overline{X_3 X_2 X_0} + \overline{X_3} X_1 \overline{X_0} + X_3 \overline{X_2} X_0 + X_3 \overline{X_2} X_1$ $Y_2 = \overline{X_2 X_1 X_0} + \overline{X_3 X_1} X_0 + \overline{X_3} X_2 X_1$ $Y_3 = \overline{X_3 X_2} + \overline{X_3 X_1 X_0}$.

25. A method as in claim 15, wherein n=4, wherein the reciprocal mathematical operation is of the form 1/sqrt (x), wherein the four MSBs of the input mantissa field are designated X3, X2, X1 and X0, where X3 is the MSB, wherein the four outputs are designated Y3, Y2, Y1 and Y0, and wherein the logic circuit is constructed to implement:

$Y_0 = \overline{X_3 X_2 X_0} + X_2 \overline{X_1} + X_3 \overline{X_1}$ $Y_1 = \overline{X_3 X_1} + X_2$ $Y_2 = \overline{X_3 X_2} + X_3 X_2$ $Y_3 = \overline{X_3} + \overline{X_2}$.

* * * * *